(12) United States Patent
Foiret

(10) Patent No.: US 10,598,040 B2
(45) Date of Patent: Mar. 24, 2020

(54) METHOD, SYSTEM AND COMPUTER PROGRAM FOR MONITORING A TURBOMACHINE START-UP SEQUENCE BY MONITORING THE SPEED OF THE HIGH-PRESSURE SPOOL

(71) Applicant: SAFRAN AIRCRAFT ENGINES, Paris (FR)

(72) Inventor: Guilhem Alcide Auguste Foiret, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 156 days.

(21) Appl. No.: 15/781,494

(22) PCT Filed: Dec. 5, 2016

(86) PCT No.: PCT/FR2016/053206
§ 371 (c)(1),
(2) Date: Jun. 5, 2018

(87) PCT Pub. No.: WO2017/098124
PCT Pub. Date: Jun. 15, 2017

(65) Prior Publication Data
US 2018/0363494 A1    Dec. 20, 2018

(30) Foreign Application Priority Data
Dec. 7, 2015    (FR) ...................................... 15 61929

(51) Int. Cl.
*F01D 21/00*    (2006.01)
*F02C 7/26*    (2006.01)
(Continued)

(52) U.S. Cl.
CPC ........... *F01D 21/003* (2013.01); *F01D 19/00* (2013.01); *F02C 7/26* (2013.01); *F02C 7/264* (2013.01);
(Continued)

(58) Field of Classification Search
CPC ........ F01D 21/003; F01D 19/00; F02C 7/264; F02C 7/26; G01M 15/14; F05D 2260/80;
(Continued)

(56) References Cited

U.S. PATENT DOCUMENTS 7,216,489 B2 *   5/2007   Uluyol ...................... F02C 7/26
                                                        60/778
7,506,517 B2 *   3/2009   Uluyol ...................... F02C 7/26
                                                        123/305
(Continued)

FOREIGN PATENT DOCUMENTS

EP    2256319 A2    12/2010

OTHER PUBLICATIONS

International Search Report for International Application No. PCT/FR2016/053206 dated Mar. 3, 2017.
(Continued)

*Primary Examiner* — Freddie Kirkland, III
(74) *Attorney, Agent, or Firm* — Pearne & Gordon LLP

(57) ABSTRACT

The invention relates to a method of monitoring a start-up sequence of a turbomachine that comprises a compressor equipped with a rotor, a starter capable of driving the rotor in rotation and a combustion chamber. The start-up sequence comprises a first phase during which the starter increases the rotation speed of the rotor up to an instant at which fuel is injected into the turbomachine combustion chamber, and a second phase after the first phase that terminates when the starter stops driving the rotor. The method includes: acquisition (ACQ) of a signal representative of the rotation speed
(Continued)

of the rotor during the start sequence; detection (DRP1, DRP2, INT) of an instant at which there is a sudden change in the variation of said signal with time, the sudden change instant thus detected being deemed to be the instant at which an air-fuel mix is ignited in the combustion chamber.

13 Claims, 4 Drawing Sheets

(51) Int. Cl.
    *F01D 19/00*     (2006.01)
    *F02C 7/264*     (2006.01)
    *G01M 15/14*     (2006.01)
(52) U.S. Cl.
    CPC ....... *G01M 15/14* (2013.01); *F05D 2220/323* (2013.01); *F05D 2260/80* (2013.01); *F05D 2260/83* (2013.01); *F05D 2260/85* (2013.01); *F05D 2270/304* (2013.01); *F05D 2270/309* (2013.01); *F05D 2270/3011* (2013.01)
(58) Field of Classification Search
    CPC ....... F05D 2270/309; F05D 2270/3011; F05D 2260/85; F05D 2260/83; F05D 2220/323; F05D 2270/304

See application file for complete search history.

(56) References Cited

U.S. PATENT DOCUMENTS

| | | | |
|---|---|---|---|
| 7,878,004 B2 * | 2/2011 | Davies | F02C 7/22 60/39.13 |
| 9,896,958 B2 * | 2/2018 | Foiret | F02C 7/26 |
| 2007/0051111 A1 | 3/2007 | Uluyol et al. | |
| 2007/0234734 A1 | 10/2007 | Uluyol et al. | |

OTHER PUBLICATIONS

Written Opinion for International Application No. PCT/FR2016/053206 dated Mar. 3, 2017.
French Search Report issued in Patent Application No. FR 15 61929 dated Jul. 4, 2016.

* cited by examiner

METHOD, SYSTEM AND COMPUTER PROGRAM FOR MONITORING A TURBOMACHINE START-UP SEQUENCE BY MONITORING THE SPEED OF THE HIGH-PRESSURE SPOOL

This is a National Stage application of PCT international application PCT/FR2016/053206, filed on Dec. 5, 2016 which claims the priority of French Patent Application No. 15 61929 entitled "METHOD, SYSTEM AND COMPUTER PROGRAM FOR MONITORING A TURBOMACHINE START-UP SEQUENCE BY MONITORING THE SPEED OF THE HIGH-PRESSURE SPOOL", filed Dec. 7, 2015, both of which are incorporated herein by reference in their entirety.

TECHNICAL DOMAIN

The domain of the invention is monitoring of the health state of turbomachines, particularly aircraft turbojets and turboprops.

The invention aims particularly at detecting degradation of a system that could affect smooth progress with a turbomachine start-up sequence.

STATE OF PRIOR ART

A bad start-up sequence of a turbomachine engine is often the symptom of bad ignition of the air-fuel mix in the engine. There can be several reasons for the lack of ignition, including insufficient fuel or even lack of fuel, that can be due to damage to the fuel pump, the metering valve, the injectors or an insufficient or even lack of energy supply that can be caused by degradation to the ignition plug or the spark generation system.

Degradation of the system that occurs during a turbomachine start-up sequence can be monitored by the duration of the air-fuel mix ignition duration that is defined as the duration between the instant at which fuel is injected into the engine combustion chamber and the instant at which this mix ignites.

Thus, for a given turbomachine, the ignition duration can be used as an indicator for degradation of the system used to start-up the turbomachine. Therefore this indicator can be monitored over time by making a measurement at each start-up, and an alert can be raised if there is a confirmed deviation in the measured ignition duration in comparison with a reference duration. It is then possible to anticipate failures of the start-up system and to perform programmed preventive maintenance operations in order to limit costs caused by failure of the engine to start.

The position of the fuel metering valve is a reliable measurement to determine the instant at which fuel is injected into the combustion chamber. This position can precisely identify the start of opening of the fuel supply valve into the chamber.

In order to obtain the monitored indicator, namely the fuel ignition duration, the instant at which ignition of the air-fuel mix occurs then has to be detected.

It is known that such a detection is made in real time using the turbomachine EEC (Electronic Engine Computer) so as to regulate the metering law at start-up and to detect non-ignition cases. This real time ignition detection must satisfy a number of requirements.

Firstly, it has to be robust, because the EEC computer software subsequently adapts the quantity of fuel injected into the chamber. Effective but undetected ignition could compromise chances of starting the engine.

It must be made in real time, without delay, to adapt on the fly turbomachine control laws.

There is no strict precision requirement, a delay of a few seconds in detection of the ignition instant can be tolerated.

This detection takes place with a high acquisition frequency of available measurements (traditionally, one refreshment every 15 ms), which leads to a large quantity of data to be processed. However, the EEC computer calculation power is limited, which constrains the type of detection algorithm than can be used.

A health state monitoring algorithm does not satisfy the same need and consequently the same performance requirements as the algorithm to detect the ignition instant used by the EEC computer.

Firstly, the implementation of such a health state monitoring indicator is usually separated into two parts, with one part in a computer on board the aircraft, and another part off the aircraft in a workstation on the ground.

Its degree of robustness in this case is not particularly critical. Health indicators are monitored by a flight-to-flight trend following a history of several tens or even several hundred flights. Therefore occasionally undetected ignition has little effect on the global performances of the health state monitoring algorithm.

Nor is there any real time calculation constraint. The calculations can be made a posteriori because the degradation that is to be detected is slow (spread over several flights).

On the other hand, the ignition instant must be detected as precisely as possible. This precision controls the global detection performances of the health state monitoring algorithm.

Furthermore the measurement acquisition frequency may be limited (refreshment every second, or at an even longer interval). Therefore the ignition instant detection algorithm must be robust regarding this constraint. Finally, an onboard computer dedicated to monitoring the health state usually has higher performance than the EEC computer. Furthermore, health state monitoring calculations can be done on the ground in a dedicated computing station, which eliminates all constraints on the type of detection algorithm that can be used.

The EEC computer traditionally uses signals output from an exhaust gas temperature sensor to detect ignition of the air-fuel mix. This solution is very robust, and therefore provides a good solution to turbomachine control and regulation requirements. On the other hand, the sensor is located at a relatively long distance from the combustion chamber that causes an unacceptable delay and imprecision for health state monitoring needs.

In practice, detection of ignition is effective if the EEC computer detects a temperature increase of at least 35° C. after injection of fuel. This detection creates an average delay of about 3 seconds to which a random error has to be added (for example a statistically quantified sensor error).

Another technique for detecting ignition of the air-fuel mix consists of monitoring the upstream pressure from the combustion chamber called PS3 (static pressure in plane 3). Just before ignition, the pressure PS3 is very stable. Ignition of the mix causes a sudden increase (step) in this chamber inlet pressure that can be detected.

Detection of the ignition instant by monitoring the pressure PS3 is very precise, but is relatively not very robust. Depending on start-up conditions, it is fairly frequent that the sudden change in pressure PS3 is too small to be detected. Operating experience thus shows that about 10% of ignitions are not detected by this method.

PRESENTATION OF THE INVENTION

The purpose of the invention is to disclose a technique for detection of the air-fuel mix ignition instant that is reliable and precise and can satisfy the performance requirements for monitoring the health state of a turbomachine start-up system.

To achieve this, the invention discloses a method of monitoring a start-up sequence of a turbomachine that comprises a compressor equipped with a rotor, a starter capable of driving the rotor in rotation and a combustion chamber, the start-up sequence comprising a first phase that terminates at an instant at which fuel is injected into the combustion chamber and during which the starter is controlled to increase the rotation speed of the rotor, and a second phase after the first phase that terminates when the starter stops driving the rotor. This method comprises the following steps:

acquisition of a signal representative of the rotation speed of the rotor during the start-up sequence;

detection of an instant at which there is a sudden change in the variation of said signal with time, the sudden change instant thus detected being deemed to be the instant at which an air-fuel mix is ignited in the combustion chamber.

Detection of the sudden change instant includes the following operations:

determination of a first adjusted regression curve on the signal directly representative of the rotation speed of the rotor during the first phase;

determination of a second adjusted regression curve on the signal directly representative of the rotation speed of the rotor during the second phase;

identification of the instant of ignition of the air-fuel mix in the combustion chamber starting from the intersection of the first and the second regression curves.

Some preferred but non-limitative aspects of this method are as follows:

the acquired signal is directly representative of the rotation speed of the rotor during the first phase and the second phase, and detection of the instant of the sudden change consists of detecting the intersection of a non-linear variation with time during the first phase and a linear variation with time during the second phase;

each of the first and second regression curves is associated with a quality indicator, and the turbomachine start-up instant is determined as being abnormal when a quality indicator is lower than a threshold;

the acquired signal is the derivative of a signal directly representative of the rotation speed of the rotor during the first phase and the second phase, and detection of the instant of the sudden change consists of detecting the intersection of a linear variation with time during the first phase and a constant variation with time during the second phase;

it also comprises the acquisition of a signal representative of the position of a fuel combustion chamber supply valve, and determination of the instant at which fuel is injected into the combustion chamber starting from said signal representative of the position of said valve;

it also comprises acquisition of a signal representative of the pressure of the gas flow circulating at the inlet of the combustion chamber, and identification of the ignition instant of the air-fuel mix into the combustion chamber when detecting of a sudden variation in the amplitude of said signal representative of said pressure;

it also comprises determination of a turbomachine ignition duration as being the duration between the injection instant and the ignition instant identified by detection of a sudden variation of the amplitude of said signal representative of said pressure, or in the absence of detection of a sudden variation of the amplitude of said signal representative of said pressure, as being the duration between the injection instant and the ignition instant deemed to be the same as the instant of the detected sudden change;

the step to detect a sudden change instant in the variation of said signal with time is made on the ground by a turbomachine health monitoring device.

The invention also relates to a system for monitoring a turbomachine start sequence that comprises a computer configured to implement the step in the method to detect an instant of sudden change in the variation with time of the acquired signal. The invention also includes a computer program including program code instructions for execution of the step in the method of detecting the instant of the sudden change in the variation with time of the acquired signal.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED PRESENTATION OF PARTICULAR EMBODIMENTS

The invention relates to a method of monitoring a start-up sequence of a turbomachine. The turbomachine comprises a combustion chamber in which the ignition of an air-fuel mix takes place, an injector to supply the combustion chamber with fuel through a valve, the position of which is regulated by a metering valve.

The turbomachine also comprises a compressor rotor and a starter capable of driving the rotor in rotation. The compressor is preferably located close to the combustion chamber. It may for example by the high pressure compressor in the case of a twin-spool turbomachine.

The start-up sequence comprises a first phase during which the starter is controlled to increase the rotation speed of the rotor in a time window between reception of a turbomachine start order and an instant at which fuel is injected into the turbomachine combustion chamber. This first phase can be qualified as a pre-injection phase.

The method may also comprise the acquisition of a signal representative of the position of the fuel combustion chamber supply valve, and determination of the instant at which fuel is injected into the combustion chamber using said signal representative of the position of said valve. Thus, the first phase terminates when opening of the valve is detected.

The start-up sequence includes a second phase after the first phase that is completed when the starter stops turning the rotor (starter disengaged).

This second phase ideally begins after ignition of the air-fuel mix in the combustion chamber, and can be qualified as the post-ignition phase. To achieve this, the second phase may begin in particular after a given duration after the first phase, for example 5 seconds afterwards, to assure that ignition of the air-fuel mix is effective shortly after injection of the fuel. This given duration may be translated into a threshold on the rotation speed of the rotor to assure that the rotation speed is a speed characteristic of the second post-ignition phase. For example, this threshold may be a threshold that cannot be reached during the first phase, for example 35% of the maximum speed, or a threshold sufficiently different from the rotation speed at the end of the first phase, for example by exceeding this speed by more than 5% of its value.

Figure 3:
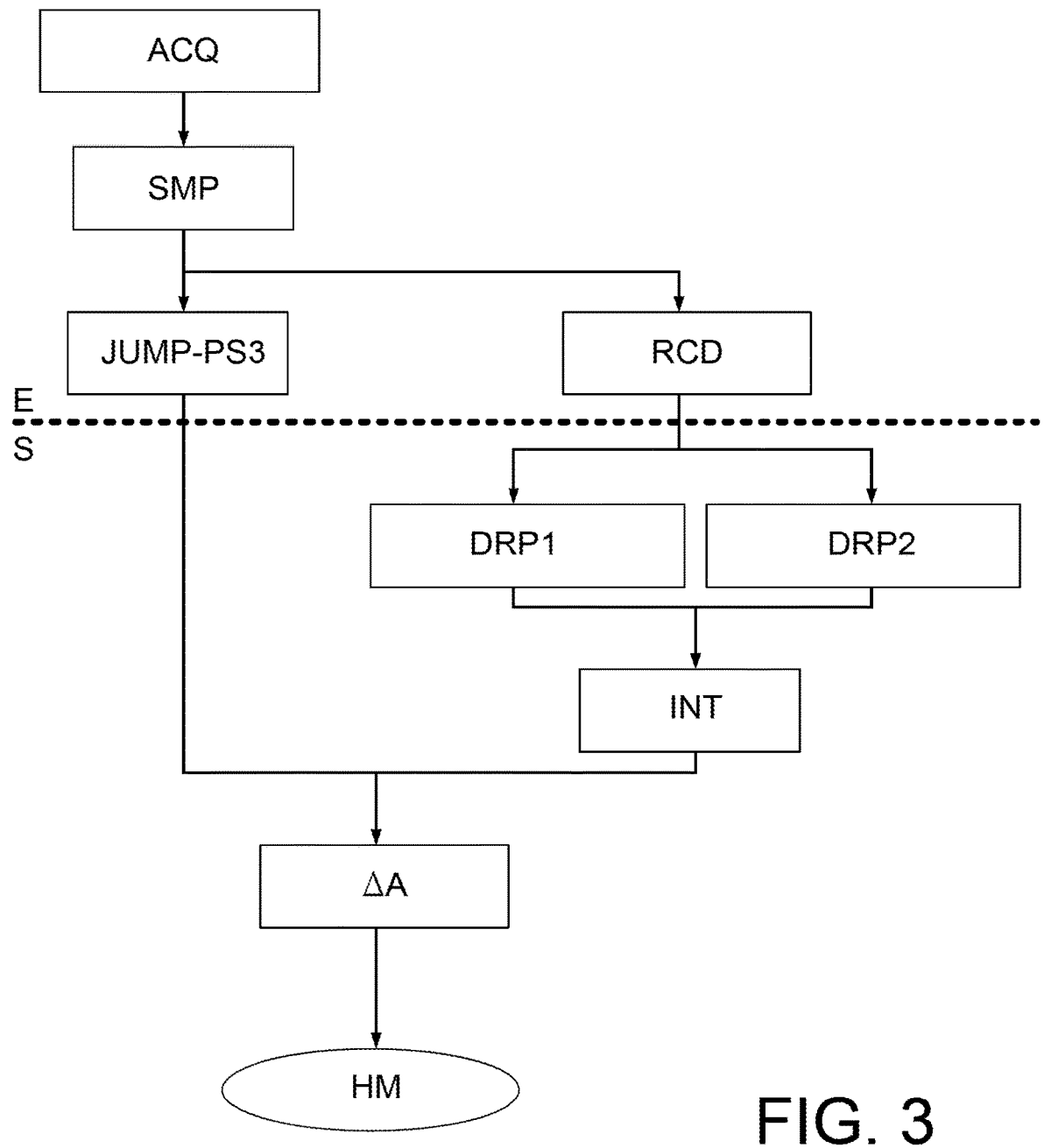
FIG. 3 is a diagram illustrating one possible embodiment of a method according to the invention.

With reference to FIG. 3 that illustrates one embodiment, the method comprises the acquisition "ACQ" of a signal directly or indirectly representative of the rotation speed of the rotor during the start-up sequence. This rotation speed is generally qualified as speed N2 when it applies to the rotation speed of the rotor fitted on the high-speed compressor of a twin-spool turbomachine. The speed N2 will be referred to in the remainder of the description, although this is not limitative of the invention.

In the framework of the invention, the identification "INT" of the ignition instant of the air-fuel mix in the detection chamber is made by monitoring this speed N2 during the start-up sequence More particularly, the invention proposes to monitor the variation with time of said signal representative of the speed N2. Detection of a sudden change instant in the variation with time of said signal can discriminate a variation with time characteristic of the first phase of a variation with time characteristic of the second phase. The sudden change instant thus detected can then be deemed to be the instant of ignition of an air-fuel mix in the combustion chamber.

In a first embodiment, the acquired signal is directly representative of the rotation speed N2 of the rotor during the start-up sequence. On FIG. 1 that represents the variation with time of the speed N2 expressed as a percentage of the maximum speed, this signal N2 is acquired at a frequency of 1 Hz. Each acquisition is represented by a circle in the case of an acquisition made during the first or the second phase and by a triangle for acquisitions made between the first and the second phase. The first phase includes a first acquisition of the speed N2 at T=1 s and a last acquisition at T=19 s corresponding to injection of fuel into the combustion chamber. The second phase includes a first acquisition of the speed N2 at T=25 s and a last acquisition at T=43 s corresponding to disengagement of the starter, in this case that takes place when speed N2 has reached 55% of the maximum speed. In this case the second phase is initiated when the speed N2 exceeds the speed $N2_1$ reached at the end of the first phase plus 5% of $N2_1$.

In the framework of this embodiment, detection of the sudden change instant consists of detecting the intersection of a non-linear variation with time of the speed N2 during the first phase with a linear variation with time of the speed N2 during the second phase.

Once the air-fuel mix has been ignited, the turbomachine and the starter output torque. The torque output by the starter reduces (linear reduction with speed), while the turbomachine increasingly participates in the driving force. The total sum of the torques is such that acceleration of the turbomachine during the second phase is constant until the starter is disengaged. This characteristic is satisfied regardless of the external start-up conditions.

Detection of the sudden change instant can include particularly the following operations:
  determination of a first regression curve RP1 adjusted on the signal directly representative of the rotation speed N2 of the rotor during the first phase;
  determination of a second regression curve RP2 adjusted on the signal directly representative of the rotation speed N2 of the rotor during the second phase; this second curve is more particularly a straight line due to the linear variation with time mentioned above, but the invention is not limited to this case and on the other contrary it includes more complex variations;
  identification of the instant of ignition of the air-fuel mix in the combustion chamber starting from the intersection of the first regression curve RP1 and the second polynomial regression curve RP2.

The first regression curve RP1 and the second regression curve RP2 can be polynomial regression curves, and particularly a first degree polynomial regression curve for the second curve RP2.

Figure 1:
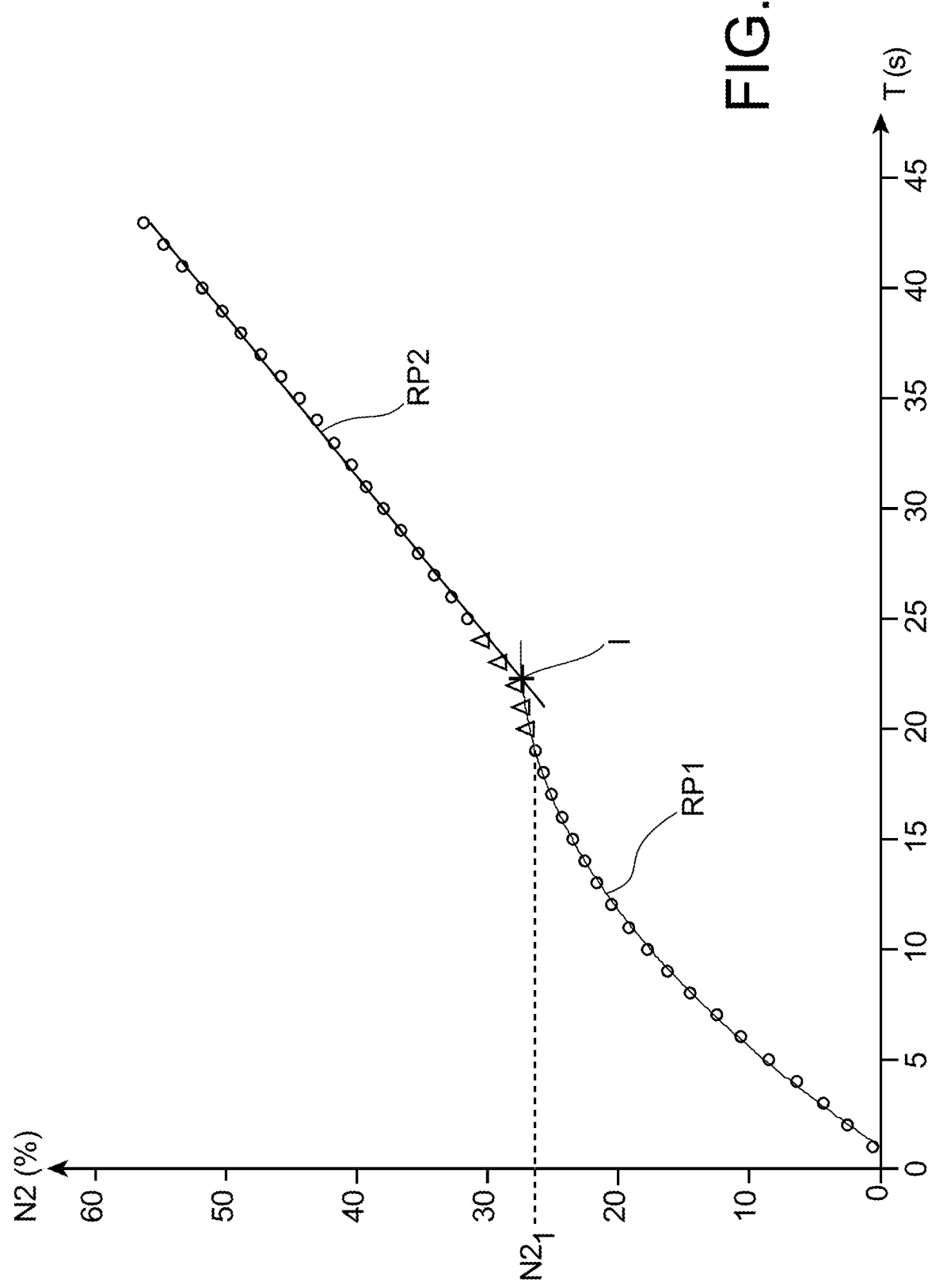
FIGS. 1 and 2 represent the variation with time of the rotation speed of a compressor rotor close to the combustion chamber during a turbomachine start sequence, and regression curves adjusted on this speed for two distinct phases in the start-up sequence.

As shown on FIG. 1, the first regression curve RP1 may be a second degree polynomial regression curve, although this is not limitative of the invention.

In particular, when the starter is pneumatic and is driven by air at an approximately constant pressure, the torque output by the starter reduces linearly with the increase in speed N2. Furthermore, the resisting torque of the turbomachine increases as the rotation speed increases. The result is that the acceleration of the engine reduces during the first phase. Eventually, a zero acceleration asymptote could be reached at which the engine torque would just compensate the resisting torque. Generally, the injection is made before this stage is reached, which explains the asymptotic shape of the variation with time curve of the speed N2 during the first phase.

It can be seen on FIG. 1 that the regression curves are satisfactorily superposed at the real points represented by the circles and the triangles. Each of the first and second regression curves is associated with a quality indicator used to calculate the standard deviation of the estimating error of the speed N2. This standard deviation is 0.25%*N2 during the first phase and 0.3%*N2 during the second phase. Nevertheless, the objective herein is to precisely know the ignition instant, and it is more useful to know the standard deviation of the estimating error of the instant for a given N2. This standard deviation is 0.17 seconds during the first phase and 0.2 seconds during the second phase.

Figure 2:
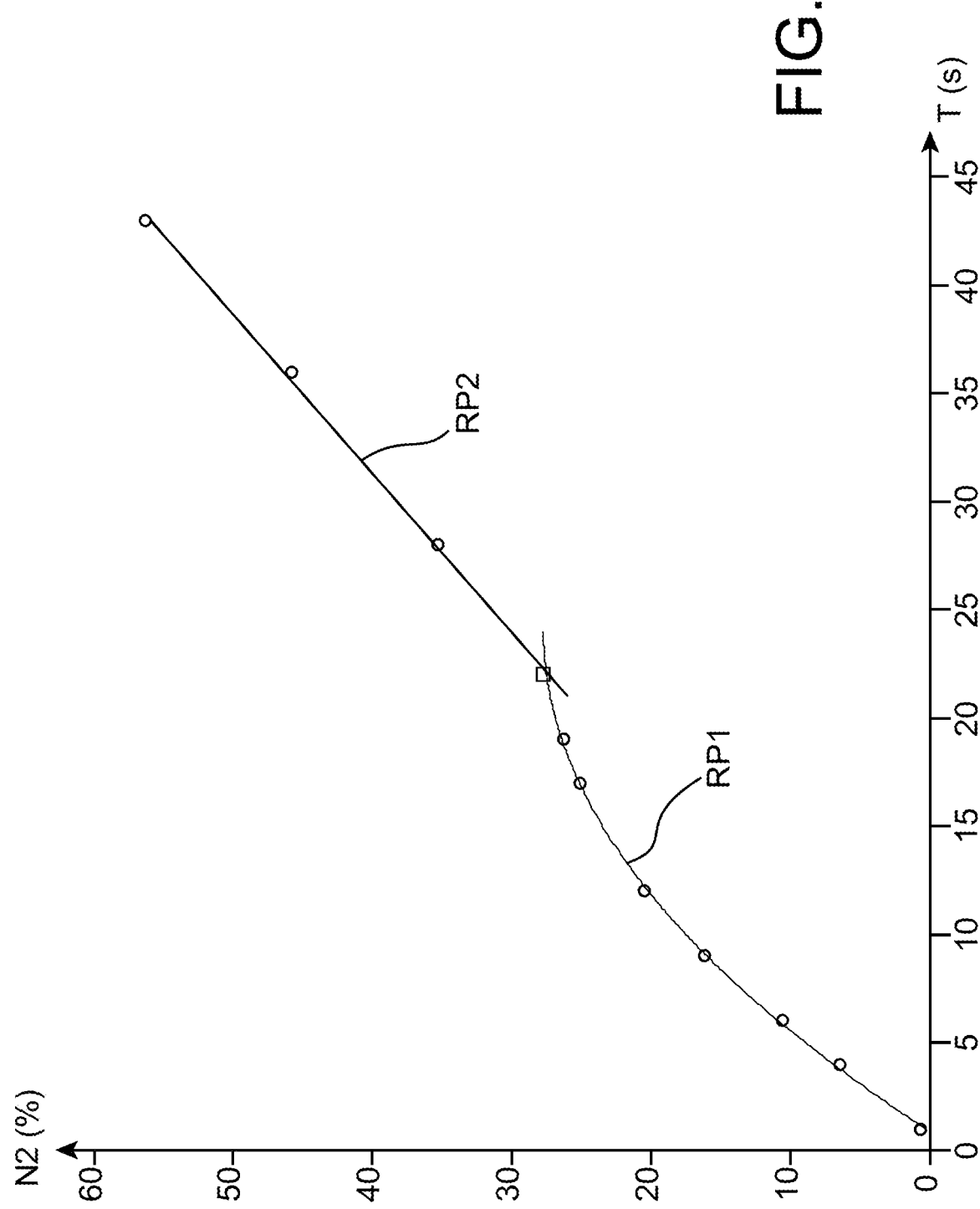

As shown on FIG. 2, the two regression curves RP1 and RP2 can also be estimated from fewer data, at least 5 acquisitions being necessary for the second order adjusted regression and at least 3 acquisitions being necessary for the first adjusted order adjusted regression in the second phase. Thus on FIG. 2, the first phase only includes seven acquisitions (corresponding to the beginning of rotation as the starting point and injection of fuel as the end point, with one acquisition between these two points corresponding to every 5% of the speed, up to 25%), while the second phase only comprises three acquisitions (taken when the speed N2 is 35%, 45% and 55% of the maximum speed respectively).

On FIG. 2, the rectangle corresponds to the ignition instant determined by detection of a sudden change in the amplitude of the pressure PS3. The ignition instant thus determined by the sudden change in the pressure PS3 is 22.045 seconds. This can be compared with the ignition instant determined by identification of the instant of the sudden change in the variation with time of speed N2 (identification of the intersection of the regression curves of the first and second phases in the framework of the variant embodiment shown in FIG. 3) that is 22.121 seconds. Thus, the detection error by monitoring the speed N2 versus by monitoring the pressure PS3 is equal to 0.076 seconds, which is a negligible error compared with the event to be detected.

In a second embodiment, the acquired signal is a derivative of a signal directly representative of the rotation speed of the rotor during the start-up sequence. In other words, in this case the acceleration is used with its variation with time to detect the ignition instant. Thus in this embodiment, the sudden change instant is detected by detecting the intersection of a linear variation with time during the first phase (decrease in acceleration until it becomes almost zero at the time of fuel injection) with a constant variation in time during the second phase (after a sudden increase at the time of ignition).

As for the first embodiment, the sudden change instant can be determined as being the intersection of regression curves for each of the first and the second phases. As a variant, detection of the sudden change instant includes determination of the minimum of the derivative after fuel is injected into the combustion chamber.

It is important to note that the derivative of speed N2 requires acquisition of the speed at a sufficiently high frequency to obtain sufficient precision. Therefore this second embodiment is more suitable for use by onboard software in the EEC computer. On the other hand, it enables real time detection.

In one possible embodiment shown on FIG. 3, the invention proposes to associate detection of the ignition instant by monitoring the speed N2 with detection of ignition by monitoring the pressure of the gas flow circulating at the input to the combustion chamber, for example the pressure PS3 in the case of a twin-spool turbomachine.

The method according to the invention may be implemented onboard an aircraft computer, or on the other hand it can be implemented elsewhere in a station on the ground. As shown on FIG. 3, it can also be made in these two domains onboard E/on the ground S, nevertheless the boundary between onboard/ground remains adaptable depending on needs and constraints of the turbomachine and the aircraft.

The method according to the invention includes acquisition over time "ACQ", and sampling "SMP" of the signal representative of the rotation speed N2 of the rotor and the signal representative of the pressure PS3 of the gas flow circulating at the input to the combustion chamber during the start-up sequence. The different samples of the signal representative of the rotation speed N2 of the rotor are recorded during an operation "RCD".

Figure 4:
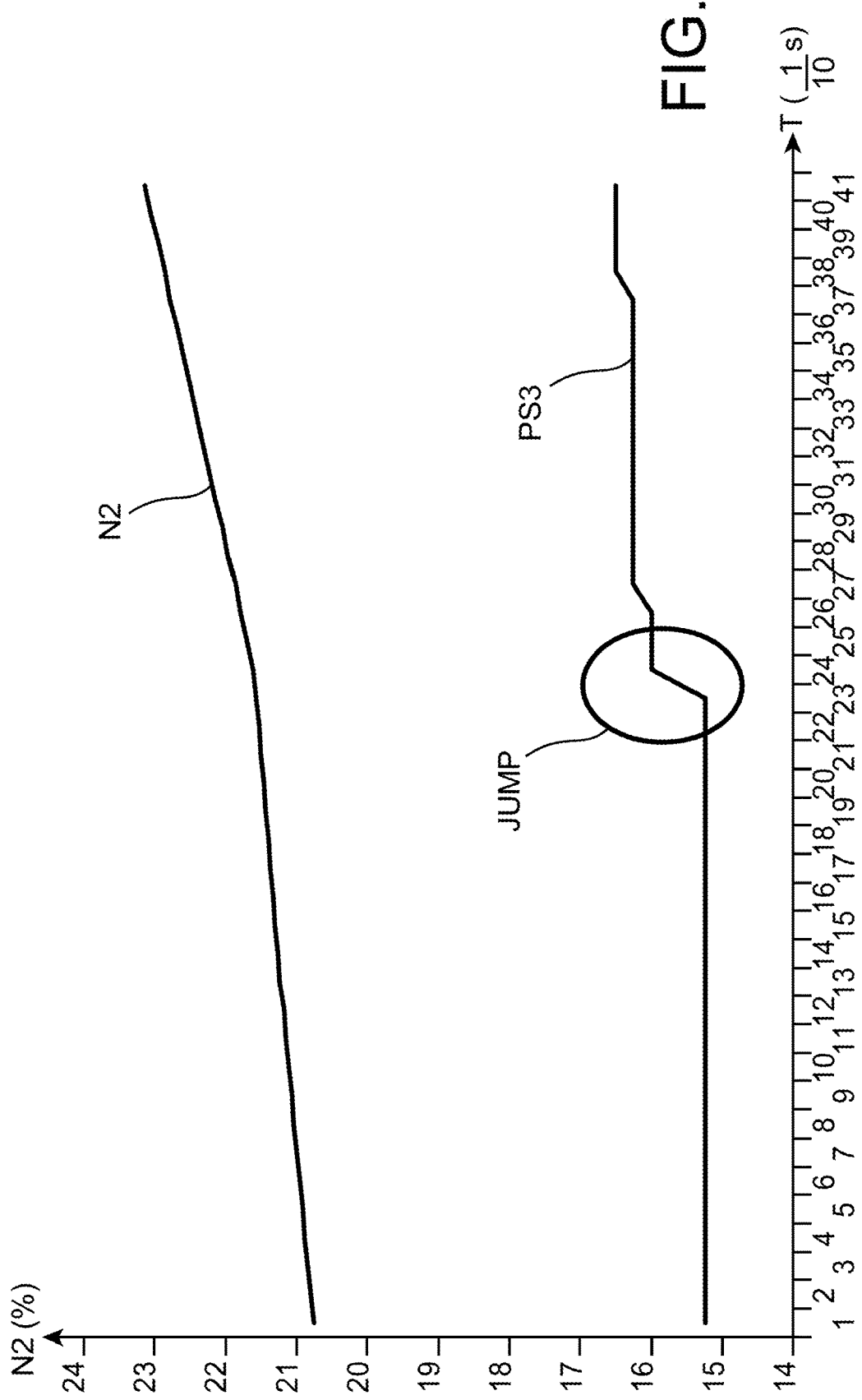
FIG. 4 illustrates the variation of the rotation speed of the compressor rotor and the compressor outlet pressure with time, during a turbomachine start-up sequence.

The method includes identification of the instant of ignition of the air-fuel mix in the combustion chamber during detection "JUMP-PS3" of a sudden variation in the amplitude of said signal representative of said pressure. FIG. 4 illustrates such a sudden variation JUMP.

The operations mentioned above are implemented in the onboard domain E by software in an aircraft computer. The operations described below are implemented in the ground domain S, for example by a device monitoring the turbomachine health state.

The different samples of the signal representative of the rotation speed N2 recorded during operation "RCD" are analysed so as to determine a first adjusted regression curve on signal N2 during the first phase during an operation "DRP1", and a second adjusted regression curve on signal N2 during the second phase, during an operation "DRP2". Then during an operation "INT", the ignition instant is identified starting from the intersection of the first and the second regression curves.

When the ignition instant has been determined by monitoring the pressure PS3, the ignition duration is determined during an operation "ΔA" as being the duration between the injection instant and the ignition instant identified by the sudden change in PS3.

When the ignition instant has not been determined by monitoring the pressure PS3, the operation "ΔA" is performed using the ignition instant as determined by monitoring the speed N2.

The ignition duration thus determined can be used by turbomachine health state monitoring algorithms, during an operation referenced "HM" on FIG. 3.

The principles described above have been applied on a database of 500 real start-ups.

50 ignitions out of these 500 start-ups, namely about 10% of the start-ups, were not detected by detection from the PS3 measurement.

Since detection by the PS3 measurement is the reference in terms of precision, the average difference with detection by the speed measurement N2 is 0.15 seconds (N2 being detected later than detection by the sudden change in PS3). This error is negligible for the event to be detected and is of the same order of magnitude as the standard sampling time period of health state monitoring algorithms (usually a maximum of 8 Hz, which is a period of 0.125 sec). Thus, with the method illustrated on FIG. 3, a 100% detection rate of ignition of the air-fuel mix during start-up can be achieved, with a precision compatible with requirements of health state monitoring algorithms In one variant embodiment, each of the first and second regression curves is associated with a quality indicator, and the turbomachine start-up instant is determined as being abnormal when a quality indicator is lower than a threshold. Start-up sequence data can then be labelled as being invalid, and the abnormal start-up sequence is not used by health state monitoring algorithms.

The invention is not limited to the method described above, but also includes a system for monitoring a turbomachine start-up sequence that comprises a compressor provided with a rotor, a starter capable of driving the rotor in rotation and a combustion chamber, the monitoring system being characterised in that it comprises a computer configured to implement the step in the method for detection of a sudden change instant in the variation with time of the acquired signal. In particular this monitoring system can be a remote system on the ground. In particular, it can implement operations "DRP1", "DRP2" and "INT" in FIG. 3.

The invention also includes a computer program product including code instructions for execution of the step in the method of detecting an instant of sudden change in the variation with time of the acquired signal.

What is claimed is:

1. A method for monitoring a start-up sequence of a turbomachine that comprises a compressor equipped with a rotor, a starter capable of driving the rotor in rotation and a combustion chamber, the start-up sequence comprising a first phase that terminates at an instant at which fuel is injected into the combustion chamber and during which the starter is controlled to increase the rotation speed of the rotor, and a second phase after the first phase that terminates when the starter stops driving the rotor, the method including the steps of:

acquiring signal representative of the rotation speed of the rotor during the start sequence, and detecting an instant at which there is a sudden change in the variation of said signal with time, the sudden change instant thus detected being deemed to be the instant at which an air-fuel mix is ignited in the combustion chamber, wherein said detecting includes:

determining a first variation regression curve that fits on the signal acquired during the first phase;

determining a second variation regression curve (RP2) that fits on the signal acquired during the second phase;

identifying the instant of ignition of the air-fuel mix in the combustion chamber using the intersection (I) of the first and the second regression curves.

2. The method according to claim 1, in which the acquired signal is directly representative of the rotation speed of the rotor during the first phase and the second phase, and in which the the first regression curve has a non-linear variation with time and the second regression curve has a linear variation with time.

3. The method according to claim 2, in which the first regression curve and the second regression curve are polynomial regression curves.

4. The method according to claim 3, in which the first regression curve is a second degree polynomial regression curve.

5. The method according to claim 1, in which each of the first and second regression curves is associated with a quality indicator, and in which the instant at which the air-fuel mix is ignited in the combustion chamber is determined as being abnormal when a quality indicator is lower than a threshold.

6. The method according to claim 1, in which the acquired signal is the derivative of a signal directly representative of the rotation speed of the rotor during the first phase and the second phase, and in the first regression curve has a linear variation and the second regression curve has a constant variation with time.

7. The method according to claim 1, further comprising acquiring a signal representative of the position of a fuel supply valve, and determining the instant at which fuel is injected into the combustion chamber using said signal representative of the position of said fuel supply valve.

8. The method according to claim 1, further comprising acquiring a signal representative of the pressure of a gas flow circulating at an inlet of the combustion chamber, and identifying the instant at which the air-fuel mix is ignited in the combustion chamber when detecting a sudden variation in the amplitude of said signal representative of said pressure.

9. The method according to claim 8, also comprising determining a turbomachine ignition duration as being the duration between the instant at which fuel is injected into the combustion chamber and the instant at which the air-fuel mix is ignited in the combustion chamber identified by detection of the sudden variation in the amplitude of said signal representative of said pressure, or in the absence of detection of a sudden variation in the amplitude of said signal representative of said pressure, as being the duration between the instant at which fuel is injected into the combustion chamber and the instant at which the air-fuel mix is ignited in the combustion chamber deemed to be the the instant at which there is a sudden change in the variation of said signal with time.

10. The method according to claim 1, detecting the instant at which there is a sudden change in the variation of said signal with time is made on the ground by a turbomachine health monitoring device.

11. The method according to claim 1, in which the second phase begins as soon as the rotation speed of the rotor exceeds a predetermined threshold.

12. A system for monitoring a turbomachine start-up sequence that comprises a compressor provided with a rotor, a starter capable of driving the rotor in rotation and a combustion chamber, the monitoring system comprising a computer configured to implement the step in the method according to claim 1 of detecting the instant at which there is a sudden change in the variation with time of the acquired signal.

13. A computer program including program code instructions for execution of the step in the method according to claim 1 of detecting the instant at which there is a sudden change in the variation with time of the acquired signal.

* * * * *